US012034214B2

(12) United States Patent
Yoo et al.

(10) Patent No.: US 12,034,214 B2
(45) Date of Patent: Jul. 9, 2024

(54) ANTENNA APPARATUS

(71) Applicant: KMW INC., Hwaseong-si (KR)

(72) Inventors: Chang Woo Yoo, Hwaseong-si (KR); Kyo Sung Ji, Hwaseong-si (KR); Min Seon Yun, Hwaseong-si (KR); Hye Yeon Kim, Hwaseong-si (KR)

(73) Assignee: KMW INC., Hwaseong-si (KR)

( * ) Notice: Subject to any disclaimer, the term of this patent is extended or adjusted under 35 U.S.C. 154(b) by 318 days.

(21) Appl. No.: 17/522,917

(22) Filed: Nov. 10, 2021

(65) Prior Publication Data

US 2022/0069476 A1 Mar. 3, 2022

Related U.S. Application Data

(63) Continuation of application No. PCT/KR2020/006226, filed on May 12, 2020.

(30) Foreign Application Priority Data

May 15, 2019 (KR) ........................ 10-2019-0056993
Feb. 3, 2020 (KR) ........................ 10-2020-0012454

(51) Int. Cl.
*H01Q 21/00* (2006.01)
*H01Q 1/02* (2006.01)
(Continued)

(52) U.S. Cl.
CPC ........... *H01Q 21/0025* (2013.01); *H01Q 1/02* (2013.01); *H01Q 1/42* (2013.01); *H01Q 1/526* (2013.01); *H01Q 5/50* (2015.01); *H01Q 21/065* (2013.01)

(58) Field of Classification Search
CPC ........ H01Q 21/0025; H01Q 5/50; H01Q 1/02; H01Q 1/42; H01Q 1/526; H01Q 21/065
See application file for complete search history.

(56) References Cited

U.S. PATENT DOCUMENTS 6,259,933 B1 * 7/2001 Bambridge .............. H04B 1/38 343/702
7,043,280 B1 * 5/2006 Shields .................. H01Q 1/246 343/702
(Continued)

FOREIGN PATENT DOCUMENTS

DE 10-2016-112701 A1 1/2018
EP 3993567 A1 * 5/2022 ............. H01L 23/13
(Continued)

OTHER PUBLICATIONS

International Search Report mailed Aug. 27, 2020 for International Application No. PCT/KR2020/006226 and its English translation.
(Continued)

*Primary Examiner* — Graham P Smith
*Assistant Examiner* — Jordan E. DeWitt
(74) *Attorney, Agent, or Firm* — Insight Law Group, PLLC; Seung Lee

(57) ABSTRACT

The present invention relates to an antenna apparatus and, in particular, comprises: a main housing having an inner space formed therein so as to embed a main board and having a plurality of radiating fins provided on an outer surface thereof; a cover housing provided so as to shield the inner space of the main housing and having a plurality of radiating fins provided on an outer surface thereof; and a plurality of unit antenna blocks detachably coupled so as to occupy a portion of the outer surface of the cover housing, and having an antenna substrate embedded therein, the antenna substrate having one or more antenna elements and one or more antenna filters combined thereto, wherein the plurality of unit antenna blocks are signal-connected to the main board via at least one connecting card, thereby providing an advantage that dual banding can be realized as well as enabling effective heat dissipation.

19 Claims, 14 Drawing Sheets

(51) Int. Cl.

| | |
|---|---|
| ***H01Q 1/42*** | (2006.01) |
| ***H01Q 1/52*** | (2006.01) |
| ***H01Q 5/50*** | (2015.01) |
| ***H01Q 21/06*** | (2006.01) |

(56) References Cited

U.S. PATENT DOCUMENTS

| | | | | |
|---|---|---|---|---|
| 7,142,821 | B1 * | 11/2006 | Mohuchy | H01Q 9/27 343/893 |
| 7,848,108 | B1 * | 12/2010 | Archambeault | H01L 23/552 165/185 |
| 8,781,409 | B2 * | 7/2014 | Peng | H01Q 1/02 455/90.3 |
| 11,495,881 | B1 * | 11/2022 | Harvey | H01Q 1/02 |
| 2004/0014508 | A1 * | 1/2004 | Seo | H05K 1/0203 455/562.1 |
| 2004/0203528 | A1 * | 10/2004 | Ammar | H01Q 21/0087 455/90.3 |
| 2005/0026647 | A1 * | 2/2005 | Li | H04B 1/38 455/188.1 |
| 2010/0066631 | A1 * | 3/2010 | Puzella | H01Q 9/0414 29/601 |
| 2011/0188205 | A1 * | 8/2011 | MacManus | H05K 7/20 361/703 |
| 2012/0155015 | A1 * | 6/2012 | Govindasamy | H01L 23/36 361/688 |
| 2014/0133094 | A1 * | 5/2014 | MacManus | H05K 7/20 361/690 |
| 2015/0048978 | A1 * | 2/2015 | Derovanessian | H05K 7/20 343/702 |
| 2015/0049438 | A1 * | 2/2015 | Derovanessian | H05K 7/20463 361/714 |
| 2016/0020817 | A1 * | 1/2016 | Chen | H04B 17/12 370/278 |
| 2016/0113146 | A1 * | 4/2016 | Rowe | H05K 7/20154 361/695 |
| 2016/0261030 | A1 * | 9/2016 | Kim | H01Q 1/1264 |
| 2016/0380355 | A1 * | 12/2016 | Lysejko | H04B 7/0621 343/853 |
| 2017/0077587 | A1 * | 3/2017 | Fleancu | H01Q 1/20 |
| 2017/0214150 | A1 * | 7/2017 | Zhao | H01L 23/36 |
| 2017/0347490 | A1 * | 11/2017 | Romig | H01Q 1/2283 |
| 2018/0019769 | A1 * | 1/2018 | Hu | H04B 1/036 |
| 2018/0219277 | A1 * | 8/2018 | Hirata | H01Q 1/02 |
| 2019/0006731 | A1 * | 1/2019 | Chiu | H01Q 21/065 |
| 2019/0131706 | A1 * | 5/2019 | Raney | H01Q 21/0075 |
| 2019/0267701 | A1 * | 8/2019 | Kim | H01Q 21/28 |
| 2019/0268046 | A1 * | 8/2019 | Kim | H01Q 21/0006 |
| 2019/0334622 | A1 * | 10/2019 | Ho | H01Q 9/0421 |
| 2020/0028237 | A1 * | 1/2020 | Kim | H01Q 1/02 |
| 2021/0300520 | A1 * | 9/2021 | Rhoden | H01Q 1/28 |
| 2021/0408674 | A1 * | 12/2021 | Chang | H01B 3/441 |
| 2022/0069437 | A1 * | 3/2022 | Yoo | H01Q 1/2266 |
| 2022/0069476 | A1 * | 3/2022 | Yoo | H01Q 1/526 |
| 2023/0327345 | A1 * | 10/2023 | Kim | H03F 3/195 |

FOREIGN PATENT DOCUMENTS

| | | | | | |
|---|---|---|---|---|---|
| JP | 2004039857 | A | * | 2/2004 | |
| JP | 2016-506614 | A1 | | 6/2014 | |
| JP | 2014-103667 | A1 | | 3/2016 | |
| JP | 2017046121 | A | * | 3/2017 | H01Q 1/02 |
| KR | 10-2006-0080447 | A | | 7/2006 | |
| KR | 10-0810383 | B1 | | 3/2008 | |
| KR | 10-2017-0050437 | A | | 5/2017 | |
| WO | 2013/123913 | A1 | | 8/2013 | |
| WO | WO-2014025183 | A1 | * | 2/2014 | H01Q 1/02 |
| WO | WO-2015022032 | A1 | * | 2/2015 | H01L 23/467 |
| WO | 2016/060306 | A1 | | 4/2016 | |
| WO | WO-2016060306 | A1 | * | 4/2016 | H01Q 1/00 |
| WO | 2018/039616 | A1 | | 3/2018 | |
| WO | 2018/093173 | A1 | | 5/2018 | |
| WO | 2018-131968 | A1 | | 7/2018 | |
| WO | 2018/223854 | A1 | | 12/2018 | |
| WO | WO-2020231148 | A1 | * | 11/2020 | H01Q 1/02 |

OTHER PUBLICATIONS

Japanese office action mailed Dec. 6, 2022 from the Japanese Patent Office for Japanese Application No. 2021-567805.

Extended European Search Report mailed Sep. 6, 2023 from the European Patent Office for European Application No. 20806278.6.

* cited by examiner

ANTENNA APPARATUS

CROSS-REFERENCE TO RELATED APPLICATIONS

This application is a Continuation of International Application No. PCT/KR2020/006226, filed on May 12, 2020, which claims the benefit of and priority to Korean Patent Application Nos. 10-2019-0056993, filed on May 15, 2019; and 10-2020-0012454, filed on Feb. 3, 2020, the disclosure of which are herein incorporated by reference in their entirety.

TECHNICAL FIELD

The present disclosure relates to an antenna apparatus, and more particularly, to an antenna apparatus capable of dual banding, which can very conveniently dualize a use band.

BACKGROUND ART

A wireless communication technology, for example, a multiple-input multiple-output (MIMO) technology is a technology for significantly increasing a data transmission capacity by using multiple antennas, and is a spatial multiplexing scheme in which a transmitter transmits different data through respective transmission antennas and a receiver classifies transmission data through proper signal processing.

Accordingly, as the numbers of transmission and reception antennas are simultaneously increased, a channel capacity may be increased, thereby transmitting more data. For example, in order to increase the number of antennas to 10, about ten times the channel capacity is secured by using the same frequency band compared to a current single antenna system. In the case of a transmission and reception apparatus to which such a MIMO technology has been applied, the numbers of transmitters and filters are also increased as the number of antennas is increased.

However, in the case of an antenna apparatus to which the conventional MIMO technology has been applied, an antenna element is designed so that a frequency band corresponding to multiple antennas installed in one antenna apparatus corresponds to only a preset one band (e.g., any one of 3.5 GHz or 4.5 GHz bands). There is a problem in that the entire antenna apparatus needs to be replaced when a frequency band is changed into a different frequency band.

DISCLOSURE

Technical Problem

The present disclosure has been made to solve the technical problem, and an object of the present disclosure is to provide an antenna apparatus to which dual banding of an available frequency band can be applied.

Furthermore, an object of the present disclosure is to provide an antenna apparatus which facilitates a change in the design from a preset frequency band to a different frequency band.

Moreover, an object of the present disclosure is to provide an antenna apparatus including an antenna transmission and reception module which can be partitioned and installed for each module so that unit heat discharge efficiency of multiple heating elements can be extended.

Technical Solution

An embodiment of an antenna apparatus according to the present disclosure includes a main housing having an internal space formed therein so that a main board is embedded and provided with multiple heat discharge pins on an outside surface thereof, a cover housing provided to shield the internal space of the main housing and provided with multiple heat discharge pins on an outside surface thereof, and multiple unit antenna blocks detachably coupled in a way to occupy some of the outside surface of the cover housing and having an antenna substrate with which one or more antenna elements and one or more antenna filters are coupled embedded therein, wherein the multiple unit antenna blocks are connected to the main board through a signal through a medium of at least one connecting card.

In this case, the cover housing may be provided with a mounting part in which a part of an end of each of the multiple unit antenna blocks is received in a form in which some of the multiple heat discharge pins on the other side have been removed.

Furthermore, a penetration slot through which a connecting card connected to each of the multiple unit antenna blocks penetrates may be formed in the cover housing.

Furthermore, a calibration port may be mounted on the main board in a way to be connected to an antenna element of each of the multiple unit antenna blocks.

Furthermore, phases of frequency bands of the antenna elements of the multiple unit antenna blocks may be integrated, calibrated and controlled by the main board.

Furthermore, each of the multiple unit antenna blocks may include an antenna block body provided with a first substrate installation space having the antenna substrate installed therein and a second substrate installation space on the cover housing side in a way to be partitioned from the first substrate installation space, a pair of transmission and reception substrates installed on one side and the other side of the second substrate installation space in a way to be orthogonal to the main board, and a unit radome coupled with the antenna block body in a way to cover the first substrate installation space.

Furthermore, a one-side card slot hole with which one end of the connecting card is pinned may be provided at an end of each of the pair of transmission and reception substrates, and the main board may be provided with the other-side card slot hole with which the other end of the connecting card is pinned.

Furthermore, signal processing of the antenna elements of the multiple unit antenna blocks may be integrated and controlled by the main board.

Furthermore, the antenna block body may be provided with a pair of unit block heat sinks provided to shield the second substrate installation space on one side in a width direction thereof and the other side in a width direction thereof, respectively, and for discharging heat generated from the first substrate installation space and the second substrate installation space.

Furthermore, the pair of unit block heat sinks may be extended in parallel to one surface of the main board.

Furthermore, at least one EMI shielding unit disposed between the pair of transmission and reception substrates and shielding EMI therebetween may be further provided in the second substrate installation space of the antenna block body.

Furthermore, two transmitters (2T) and two receivers (2R) may be mounted on each of the pair of transmission and reception substrates, and eight or sixteen antenna block bodies may be coupled with the main board so that thirty two transmitters (32T) and thirty two receivers (32R) or sixty four transmitters (64T) and sixty four receivers (64R) are able to be implemented.

Furthermore, each of the multiple unit antenna blocks may further include an antenna block body provided with a substrate installation space in which the antenna substrate and a single transmission and reception substrate are installed and a unit radome coupled with the antenna block body in a way to cover the substrate installation space.

Furthermore, a one-side card slot hole with which one end of the connecting card is pinned may be provided on one surface of the single transmission and reception substrate, and the other-side card slot hole with which the other end of the connecting card is pinned may be provided in the main board.

Furthermore, a unit block heat sink for discharging heat generated from the substrate installation space may be provided on a surface of the antenna block body toward the cover housing.

Furthermore, the unit block heat sink may be extended in a way to be orthogonal to one surface of the main board.

Furthermore, a single EMI shielding unit disposed between the antenna substrate and the single transmission and reception substrate and shielding EMI therebetween may be further provided in the substrate installation space of the antenna block body.

Furthermore, four transmitters (4T) and four receivers (4R) may be mounted on the single transmission and reception substrate, and eight or sixteen antenna block bodies may be coupled with the main board so that thirty two transmitters (32T) and thirty two receivers (32R) or sixty four transmitters (64T) and sixty four receivers (64R) are able to be implemented.

Furthermore, the antenna substrate and the single transmission and reception substrate may be stacked and disposed in the substrate installation space in a way to be isolated from each other at a given interval.

Advantageous Effects

According to an embodiment of the antenna apparatus according to the present disclosure, the following various effects can be achieved.

First, there is an effect in that the antenna apparatus can be easily changed and used for single banding or dual banding because an antenna corresponding to a preset frequency band is previously provided in a way to be selectively detachable for each module before an available frequency band is set.

Second, there is an effect in that unit heat discharge efficiency can be improved because some of electric parts, that is, multiple heating elements, are separated from the main board (BB board), modulated and mounted.

DESCRIPTION OF REFERENCE NUMERALS

Figure 1:
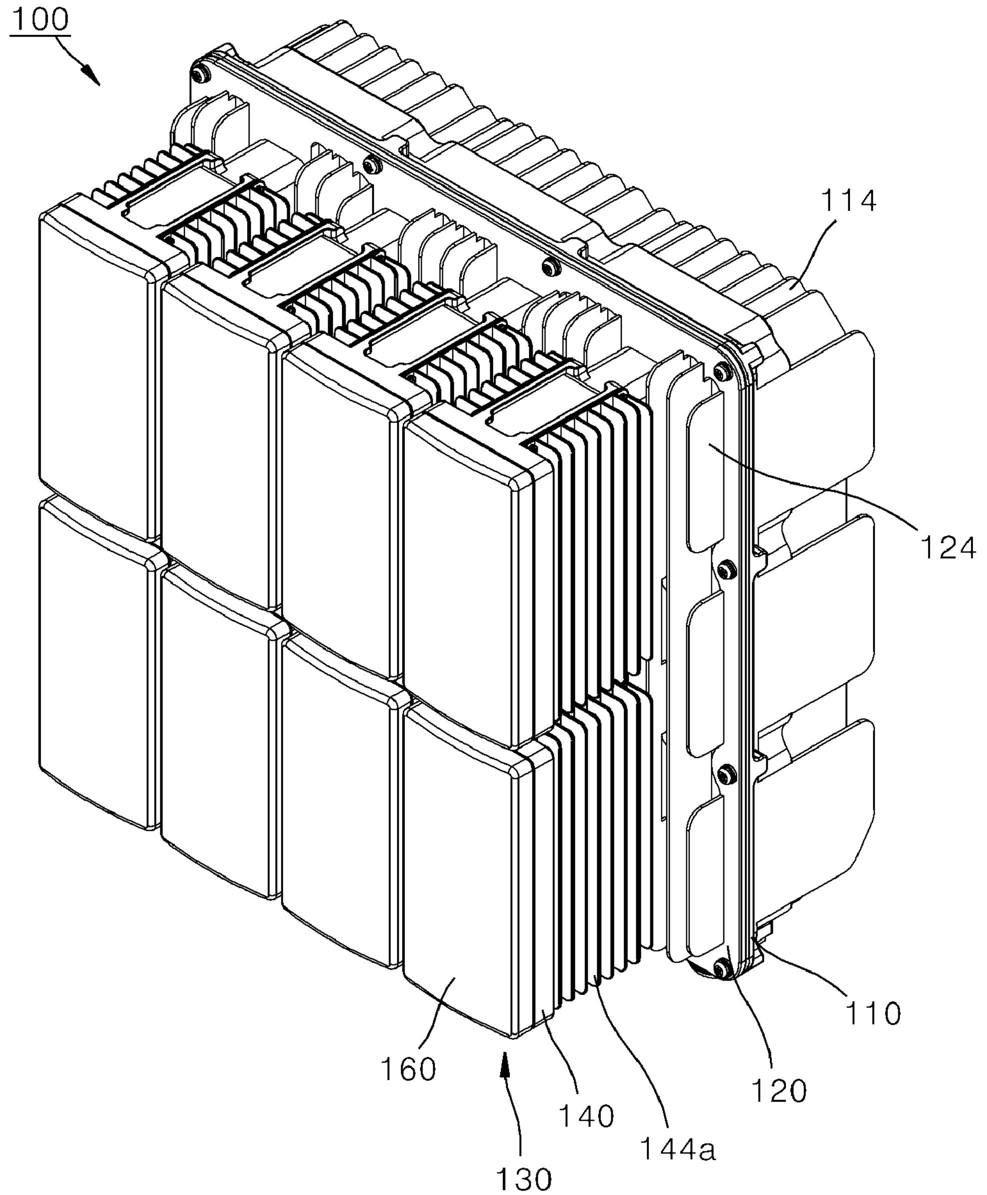
FIG. 1 is a perspective view illustrating an antenna apparatus according to an embodiment of the present disclosure.

100,200: antenna apparatus 110: main housing
111: main board 112: PSU board
114: heat discharge pin 115: other-side card slot
116: internal space 120: cover housing
121: mounting part 124: heat discharge pin
125: penetration slot 130: antenna assembly
140: multiple unit antenna blocks 141: antenna block body
**142*a*: first substrate installation space 142*b***: second substrate installation space
143: coupling block **144*a*,144*b***: unit block heat sink
145: communicating hole 147: EMI shielding unit
148: transmission and reception substrate 149: pair of connecting cards
150: antenna substrate 151: antenna substrate
152: antenna element 153: antenna filter
160: single radome

BEST MODE

Hereinafter, embodiments of antenna apparatuses according to the present disclosure will be described in detail with reference to exemplary drawings. In adding reference numerals to the elements of each drawing, it should be noted that the same elements have the same reference numerals as much as possible even if they are displayed in different drawings. Furthermore, in describing embodiments of the present disclosure, when it is determined that a detailed description of the related well-known configuration or function hinders understanding of an embodiment of the present disclosure, the detailed description thereof will be omitted.

Furthermore, in describing elements of an embodiment of the present disclosure, terms, such as a first, a second, A, B, (a), and (b), may be used. Such terms are used only to distinguish one component from the other component, and the essence, order, or sequence of a corresponding component is not limited by the terms. All terms used herein, including technical or scientific terms, have the same meanings as those commonly understood by a person having ordinary knowledge in the art to which an embodiment pertains, unless defined otherwise in the specification. Terms, such as those commonly used and defined in dictionaries, should be construed as having the same meanings as those in the context of a related technology, and are not construed as being ideal or excessively formal unless explicitly defined otherwise in the specification.

Figure 2:
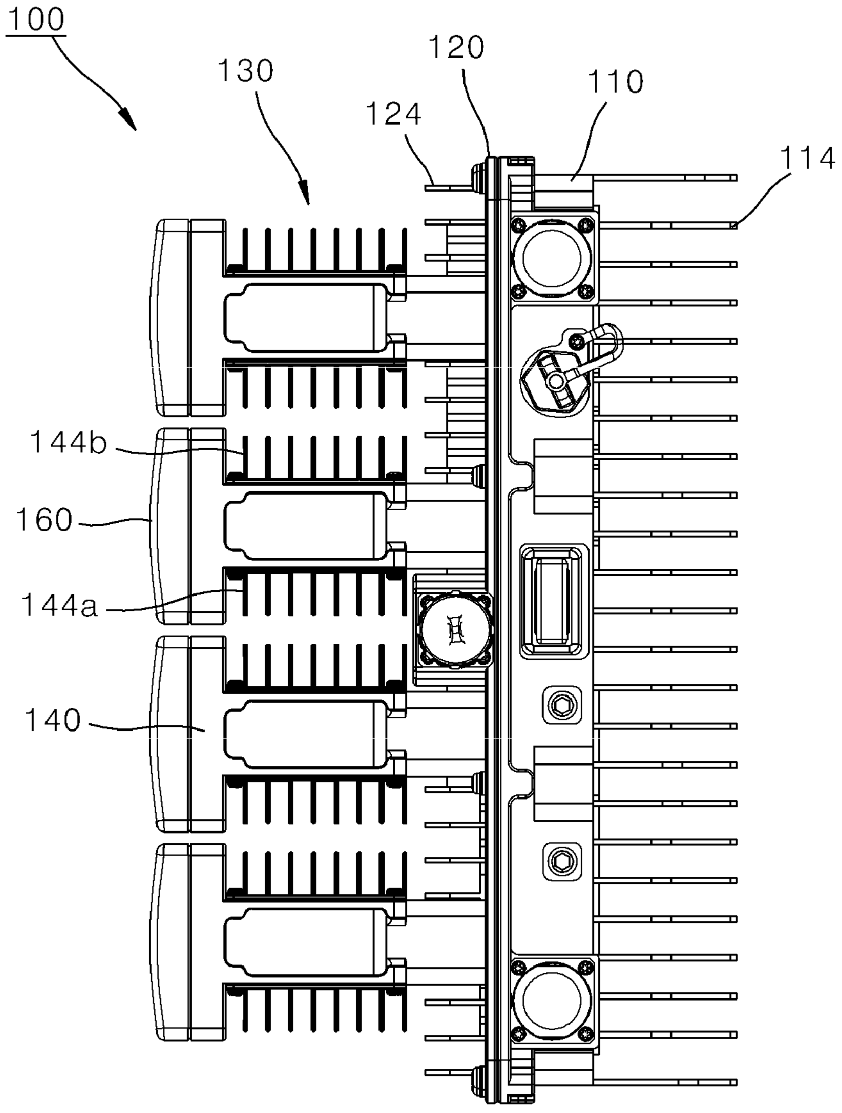
FIG. 2 is a side view of FIG. 1.
Figure 3:
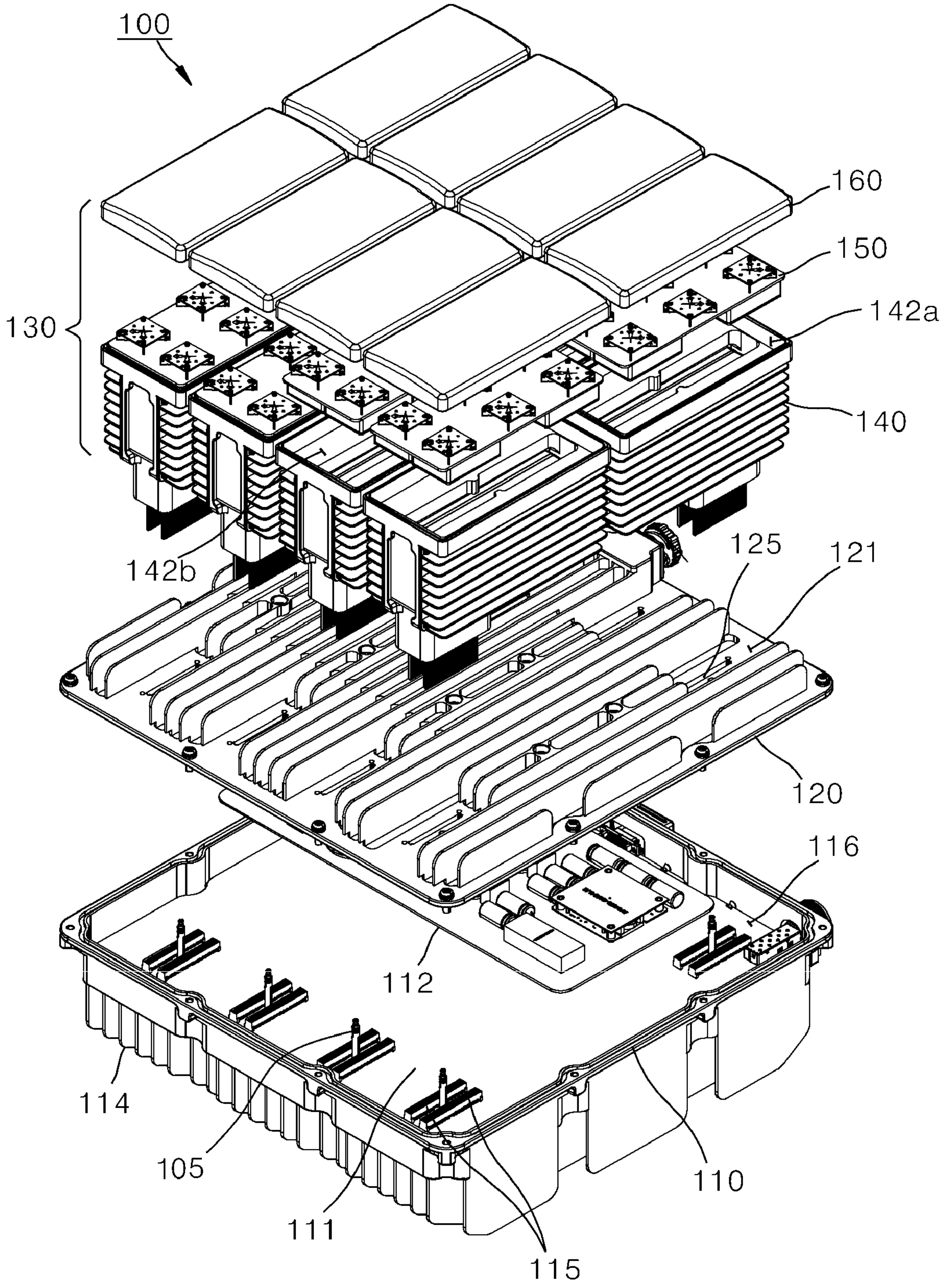
FIG. 3 is an exploded perspective view of FIG. 1.
Figure 4:
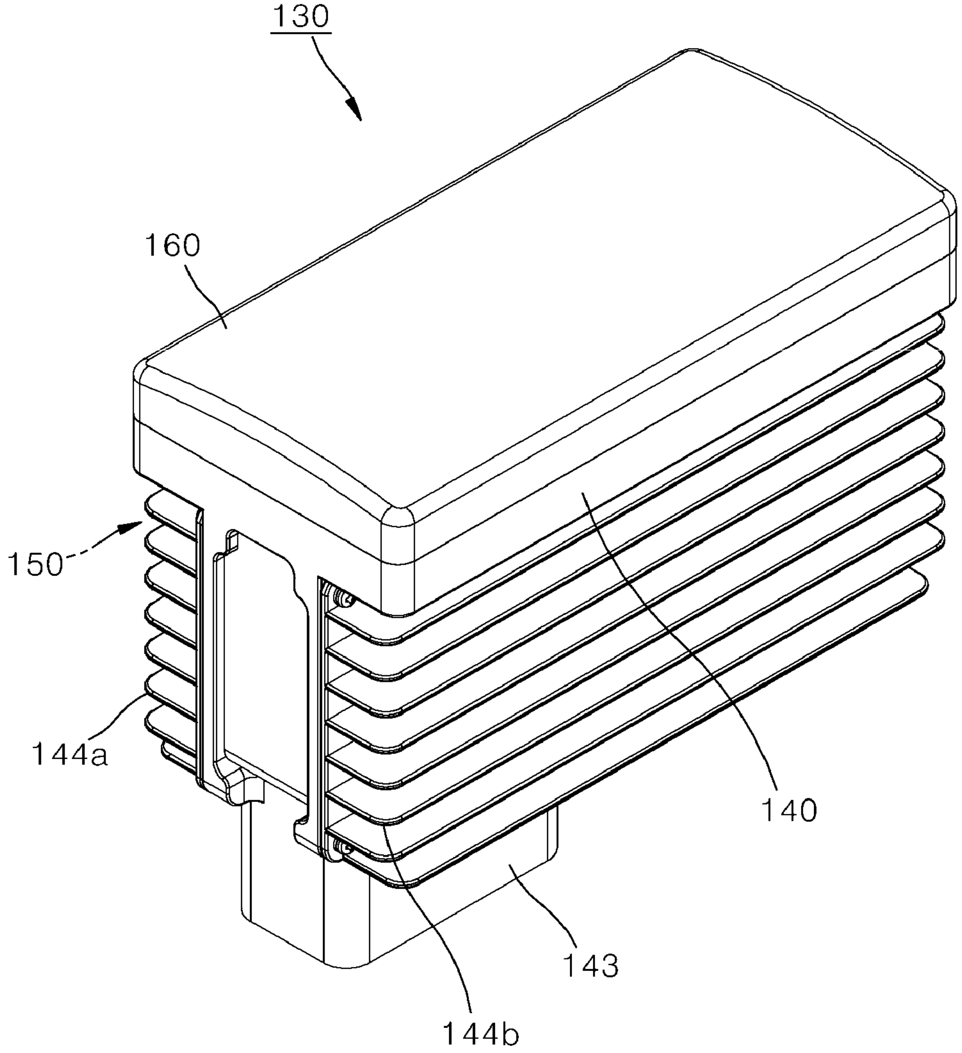
FIG. 4 is a perspective view illustrating a unit antenna block among elements of FIG. 1.
Figure 5:
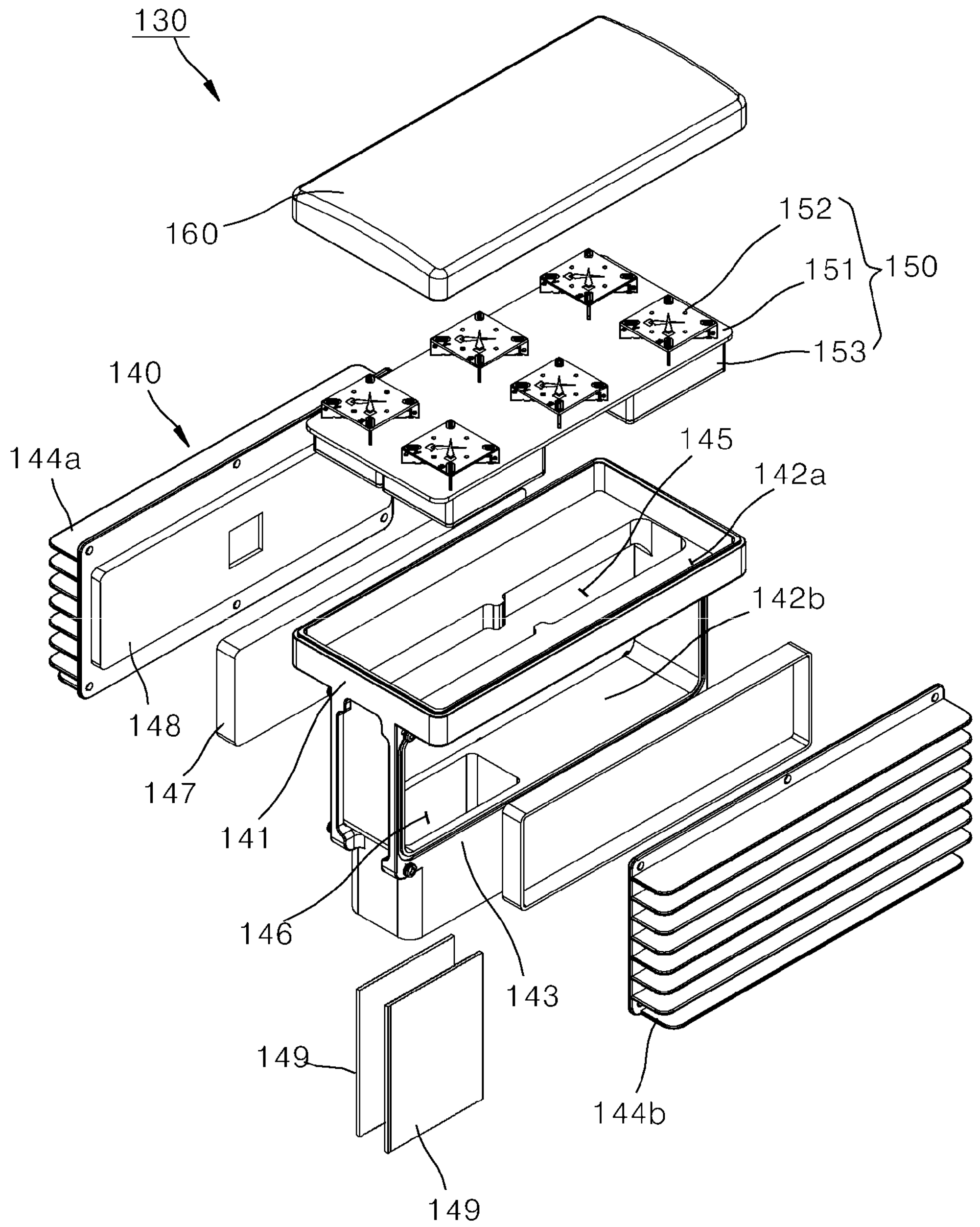
FIG. 5 is an exploded perspective view of FIG. 4.
Figure 6:
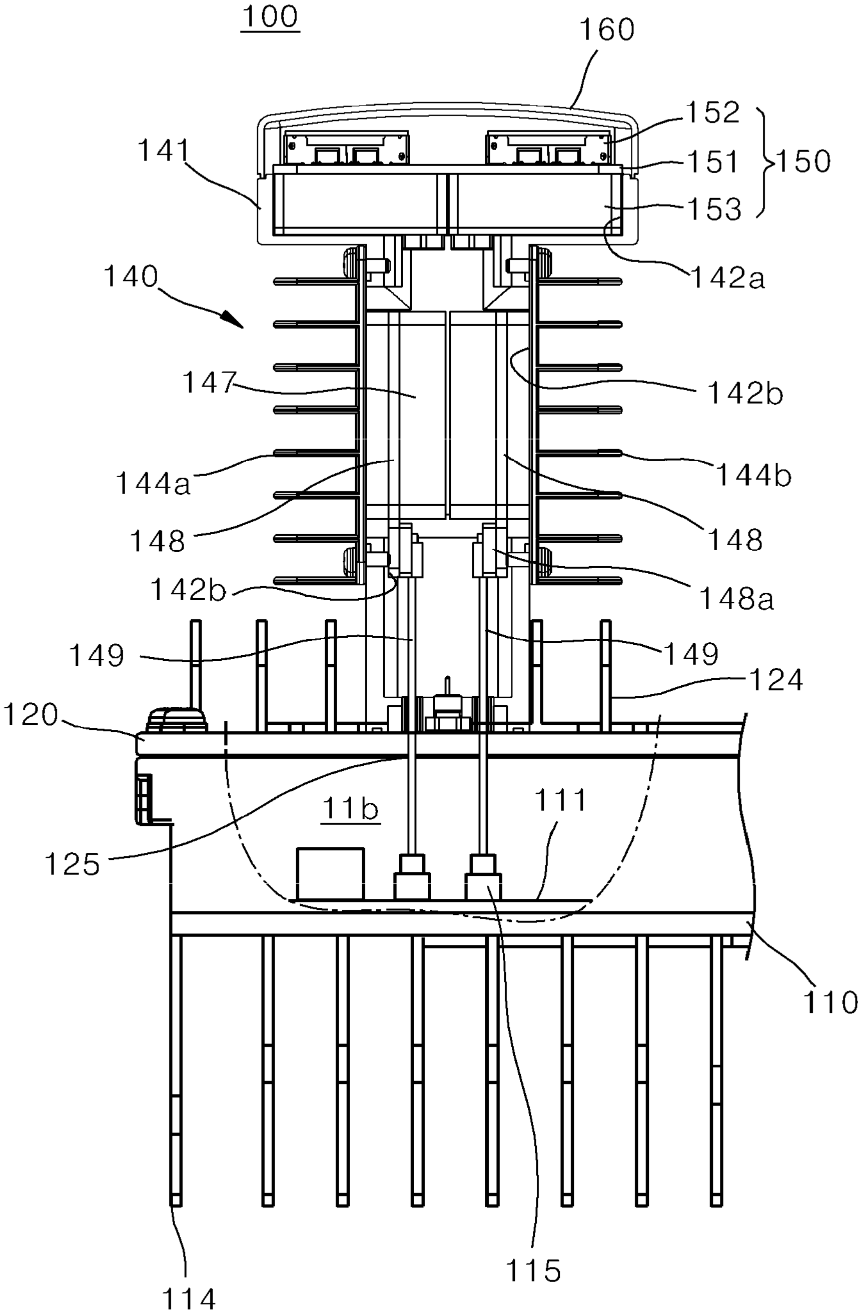
FIG. 6 is a one-side cross-sectional view illustrating a connection relation between the unit antenna block of FIG. 4 and a main board within a main housing.
Figure 7:
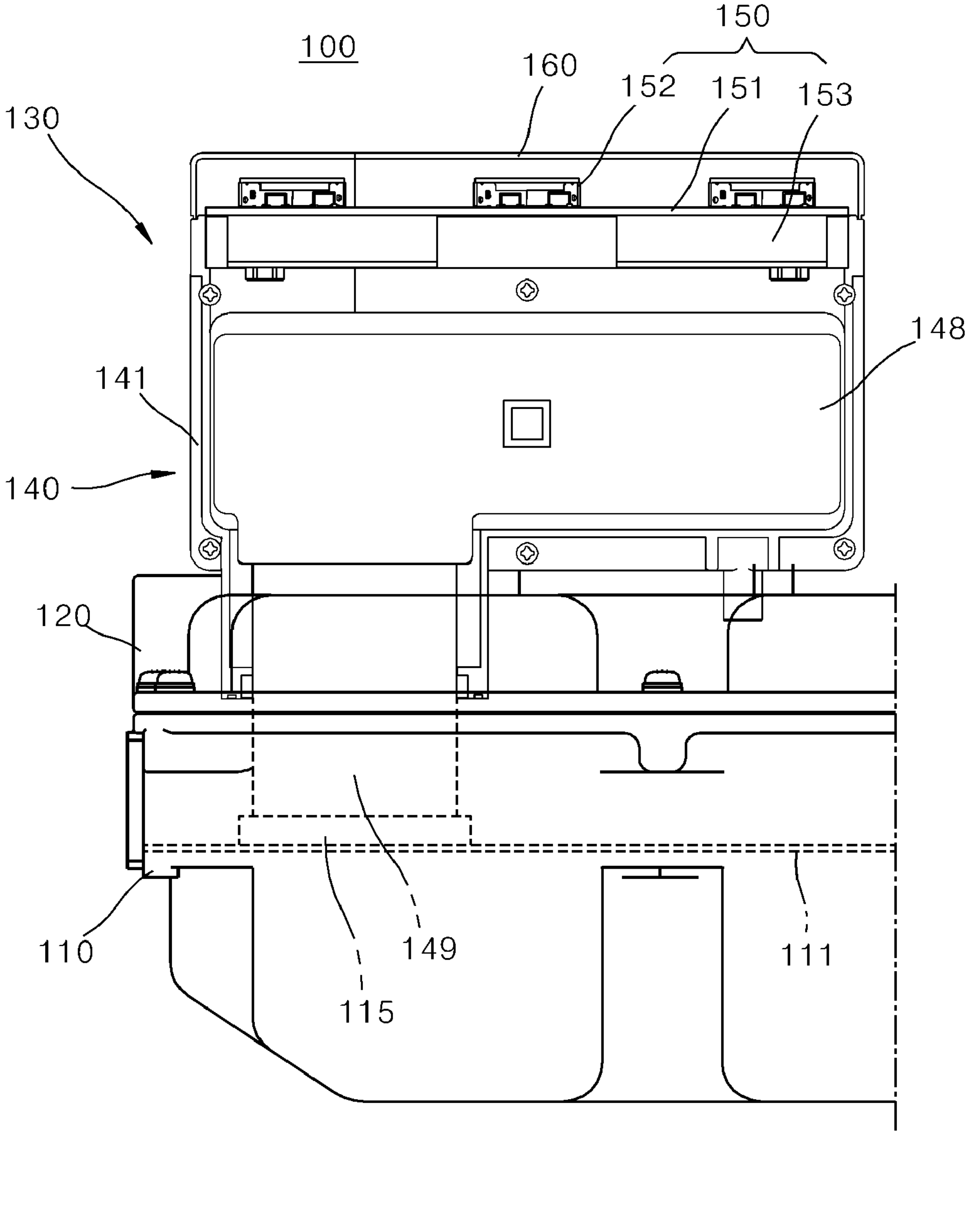
FIG. 7 is the other-side cross-sectional view illustrating a connection relation between the unit antenna block of FIG. 4 and the main board within the main housing.

FIG. 1 is a perspective view illustrating an antenna apparatus according to an embodiment of the present disclosure. FIG. 2 is a side view of FIG. 1. FIG. 3 is an exploded perspective view of FIG. 1. FIG. 4 is a perspective view illustrating a unit antenna block among elements of FIG. 1. FIG. 5 is an exploded perspective view of FIG. 4. FIG. 6 is a one-side cross-sectional view illustrating a connection relation between the unit antenna block and a main body in FIG. 4. FIG. 7 is the other-side cross-sectional view illustrating a connection relation between the unit antenna block and the main body in FIG. 4.

An embodiment 100 of an antenna apparatus according to the present disclosure is configured to include a main housing 110, a cover housing 120 and multiple unit antenna blocks 140 as may be seen from FIGS. 1 to 7.

The main housing 110 may have an internal space 116 formed therein so that a main board 111 is embedded in the main housing and may have multiple heat discharge pins 114 provided on an outside surface thereof. In this case, the main housing 110 may have one surface formed to be open in a rectangular form and have the cover housing 120 coupled thereto so that an internal space 116 is shielded against the outside. The internal space 116 has only to have a thickness in which a printed circuit board and a power supply unit (PSU) board 112 may be installed. The main housing 110 may be designed so that heat generated from heat radiation elements (not illustrated) mounted on the printed circuit board is discharged in a direction in which the multiple heat discharge pins 114 are provided, and may be designed so that heat generated from a PSU mounted on the PSU board 112 is discharged in a direction in which multiple heat discharge pins 124 of the cover housing 120 are provided.

Hereinafter, in order to prevent the confusion of understanding, an outside surface side on which the multiple heat discharge pins 114 are provided on the basis of the main housing 110 is referred to as a "rear or back", and a side on which the cover housing 120 and the multiple unit antenna blocks 140 are provided on the basis of the main housing 110 is referred to as a "front or a fore."

Although not illustrated in the drawings in detail, the main board 111 may be provided in the form of a printed circuit board (PCB) in which a calibration network is implemented, and serves as a controller which enables power feeding or signal control and calibration control for an antenna substrate 150 including RF elements and digital elements (reference numerals not indicated) installed in the multiple unit antenna blocks 140 and multiple filters 153 to be described later in detail.

A digital processing circuit is implemented in the main board 111. Multiple other-side card slots 115 to be signally connected to the multiple unit antenna blocks 140 and to be described later in detail may be provided in the front of the main board 111. This is more specifically described later.

Moreover, calibration ports 105 may be mounted on the front of the main board 111 in a way to be connected to antenna elements 152 of the multiple unit antenna blocks 140 to be described later. The calibration port 105 may control a phase deviation occurring due to the antenna filter 153 and a feeder line to be described later.

As may be seen from FIG. 3, the PSU board 112 on which multiple PSUs are mounted may be provided on one side of the main board 111, that is, between the main board 111 and the cover housing 120. The PSU of the PSU board 112 may be a power supply device for supplying power to each electric part.

The multiple heat discharge pins 114 formed on the back of the main housing 110 may be provided to prevent the deterioration of electric performance attributable to the radiation of heat by discharging heat generated from electric parts, that is, multiple heat radiation elements mounted on the main board 111, from the internal space 116 to the outside (in particular, the rear side of the main housing 110).

In this case, each of the multiple heat discharge pins 114 formed on the back of the main housing 110 may be lengthily formed up and down so that a flow passage in which the air flows is formed between adjacent heat discharge pins 114 by considering the upward discharge of the air according to heat upon heat discharge to the outside.

Furthermore, it is preferred that the main housing 110 and the multiple heat discharge pins 114 include a thermal conductive material for smooth heat discharge and include a lightweight metal material in order to secure the ease of outside installation.

Meanwhile, as may be seen from FIG. 3, the cover housing 120 is coupled with the front part of the main housing 110 and provided to shield the internal space 116 of the main housing 110, and may have the multiple heat discharge pins 124 provided on an outside surface thereof.

More specifically, as may be seen from FIG. 3, the cover housing 120 is coupled to shield an opened one surface (more specifically, a surface opposite to the side on which the multiple heat discharge pins 124 are provided) of the main housing 110. The cover housing 120 functions to protect, against the outside, the main board 111 and the PSU board 112 installed in the internal space 116 of the main housing 110.

Moreover, as described above, the multiple heat discharge pins 124 may be provided on the outside surface of the cover housing 120. The multiple heat discharge pins 124 functions to discharge, to the outside, heat collected in the internal space 116 of the main housing 110 along with the multiple heat discharge pins 114 formed on the outside surface of the main housing 110.

The multiple heat discharge pins 124 formed in the cover housing 120 may be lengthily formed up and down so that a flow passage in which the air flows is formed between adjacent heat discharge pins 124 by considering the upward discharge of the air according to heat upon heat discharge to the outside like the multiple heat discharge pins 114 formed on the back of the main housing 110.

An antenna assembly 130 including the multiple unit antenna blocks 140 may be installed on the outside surface of the cover housing 120. The antenna assembly 130 may be provided as an assembly applied to at least four to sixteenth or less MIMO antenna apparatuses.

Meanwhile, as may be seen from FIGS. 3 to 7, the multiple unit antenna blocks 140 may be detachably coupled in a way to occupy some of the outside surface of the cover housing 120, and may have therein the antenna substrate 150 to which the one or more antenna elements 152 and the one or more antenna filters 153 are coupled.

More specifically, if it is assumed that the outside surface of the cover housing 120 is provided to have a given width, as may be seen from FIG. 3, eight unit antenna blocks 140 may be firmly coupled with the cover housing 120 by using fastening members (e.g., fastening screws) (not illustrated) in a way to occupy some of the outside surface of the cover housing 120. For example, the multiple unit antenna blocks 140 may be disposed in parallel on the outside surface of the cover housing 120 by 2 rows×4 columns or 4 rows×2 columns.

In this case, mounting parts 121 in each of which a part of an end of each of the multiple unit antenna blocks 140 is received may be provided in the cover housing 120 in a form in which some of the multiple heat discharge pins 124 on the other side have been removed. One end surface of a coupling block 143 of the unit antenna block 140 to be described later may be coupled with the mounting part 121 of the cover housing 120 in a way to be closely attached thereto.

Such multiple unit antenna blocks 140 may be provided to be connected to the main board 111 through a signal through the medium of at least one connecting card 149. To this end, a penetration slot 125 through which the connecting card 149 connected to each of the multiple unit antenna blocks 140 penetrates may be additionally formed in the cover housing 120. In this case, the at least one connecting card 149 is positioned to be protected against the outside by the coupling block 143 of the unit antenna block 140 to be described later, and may be safely disposed through the penetration slot 125 without being exposed to the outside. In the antenna apparatus according to an embodiment of the present disclosure, the at least one connecting card 149 may be provided as a pair of connecting cards spaced apart from each other at a given interval in a width direction thereof.

As may be seen from FIGS. 4 to 7, each of the multiple unit antenna blocks 140 may further include an antenna block body 141 in which a first substrate installation space 142*a* having the antenna substrate 150 installed therein is provided at the front thereof and a second substrate installation space 142*b* is provided on a rear side thereof on which the cover housing 120 is provided in a way to be partitioned from the first substrate installation space 142*a*, a pair of transmission and reception substrates 148 installed on one side and the other side of the second substrate installation space 142*b* in a way to be orthogonal to the main board 111, and a unit radome 160 coupled with the antenna block body 141 in a way to cover the first substrate installation space 142*a*.

There are disclosed most (representatively, Korean Patent No. 10-1854309 (May 3, 2018)) of already known and conventional MIMO antenna apparatuses, each including a main board, a PSU board, an antenna substrate and a transmission and reception substrate to be described later stacked within a main housing having one internal space and shielding the main housing by using a radome. However, an example of such a conventional MIMO antenna apparatus has a problem in that it has limited heat discharge because electric parts, that is, multiple heat radiation elements, are integrated and installed in a limited space called the internal space of the main housing.

In order to actively solve the aforementioned conventional problem, an antenna apparatus according to embodiments of the present disclosure proposes a structure in which the various electric parts are separated, distributed and disposed in the internal space 116 of the main housing 110 and the multiple unit antenna blocks 140. For example, as may be seen from FIGS. 1 to 7, the antenna apparatus according to an embodiment of the present disclosure may be provided to fully discharge heat generated from electric parts, that is, multiple heat radiation elements mounted on the main board 111 provided in the internal space 116 of the main housing 110, through the multiple heat discharge pins 114 of the main housing 110 one side thereof and the multiple heat discharge pins 124 of the cover housing 120 on the other side 124 thereof, and may be provided to fully discharge heat generated from the antenna elements 152, the antenna filters 153, etc. mounted within the multiple unit antenna blocks 140 at portions isolated from the internal space 116 of the main housing 110 toward the outside through a pair of unit block heat sinks 144*a* and 144*b* formed on the outside of each of the multiple antennas block 140.

As may be seen from FIGS. 4 to 7, the antenna block body 141 is a block body having a vertical cross appearance having approximately a T shape. In the drawings, the first substrate installation space 142*a* is provided at a location corresponding to the top (i.e., a front part) of the T shape. Moreover, in the drawings, the second substrate installation space 142*b* is provided at a location corresponding to the bottom (i.e., a rear part) of the T shape in the antenna block body 141. The second substrate installation space 142*b* may be formed to be penetrated left and right. The second substrate installation space 142*b* formed to be penetrated left and right may be shielded by an operation of the pair of unit block heat sinks 144*a* and 144*b* to be described later being coupled together.

As may be seen from FIGS. 5 and 6, the first substrate installation space 142*a* may be formed in the form of a thin cuboid space which is long toward on one side or the other side thereof and has a relatively small up and down height approximately in the drawings. The second substrate installation space 142*b* may be formed in the form of a cuboid space which is long in the direction of one side or the other side and an up and down direction thereof and has a relatively small width approximately in the drawings. In particular, the second substrate installation space 142*b* may be communicated and formed in a way to be opened toward one side or the other side thereof in the width direction, as will be described later.

As may be seen from FIG. 5, the first substrate installation space 142*a* and the second substrate installation space 142*b* may be formed to communicate with each other by a communicating hole 145. Moreover, a card installation hole 146 in which the at least one connecting card 149 is installed in a way to penetrate therethrough may be formed in the second substrate installation space 142*b*. The card installation hole 146 may be formed to penetrate the inside of the coupling block 143 additionally extended from the bottom of the T shape of the antenna block body 141 toward the cover housing 120 by a given length. The coupling block 143 may be firmly matched and coupled with the mounting part 121 formed in the cover housing 120 by a fastening member (not illustrated).

As may be seen from FIG. 5, the antenna substrate 150 seated in the first substrate installation space 142*a* may include an antenna substrate 151, the one or more antenna elements 152 installed on the outside surface of the antenna substrate 151, and the one or more antenna filters 153 (micro bellows filters (MBFs)) installed on the inner surface of the antenna substrate 151.

The pair of transmission and reception substrates 148 seated in the second substrate installation space 142*b* may be installed in a way to be isolated from each other in the width direction thereof. In this case, one of the pair of transmission and reception substrates 148 may be disposed on one surface of the antenna block body 141 and the other of the pair of transmission and reception substrates 148 may be disposed on the other surface of the antenna block body 141 with at least one EMI shielding unit 147 shielding electromagnetic interference (EMI) between the pair of transmission and reception substrates 148 disposed therebetween. In this case, the EMI shielding unit 147 includes one-side EMI shielding unit 147 provided to shield EMI of one-side transmission and reception substrate of the pair of transmission and reception substrates 148 and the other-side EMI shielding unit 147 provided to shield EMI of the other-side transmission and reception substrate of the pair of transmission and reception substrates 148. The one-side EMI shielding unit 147 and the other-side EMI shielding unit 147 may be disposed between the pair of transmission and reception substrates 148. The one-side EMI shielding unit 147 and the other-side EMI shielding unit 147 are vertically disposed in a middle part of the second substrate installation space 142*b* in a way to be adjacent to each other. The one-side transmission and reception substrate 148 is disposed in the second substrate installation space 142*b* corresponding to the outside of the one-side EMI shielding unit 147. The other-side transmission and reception substrate 148 is disposed in the second substrate installation space 142*b* corresponding to the outside of the other-side EMI shielding unit 147.

It is natural that the pair of transmission and reception substrates 148 is connected in a way to be electrically conductive so that signals thereof are connected through the antenna substrate 151 and the communicating hole 145 previously installed in the first substrate installation space 142*a*.

Meanwhile, the pair of unit block heat sinks 144*a* and 144*b* provided to shield the second substrate installation space 142*b* on one side in the width direction thereof and the other side in the width direction thereof, respectively, and for discharging heat generated from the first substrate installation space 142*a* and the second substrate installation space 142*b*, may be provided in the antenna block body 141.

One 144*a* of the pair of unit block heat sinks 144*a* and 144*b* may be coupled with an opened one side of the second substrate installation space 142*b*, and may shield one side of the second substrate installation space 142*b*. The other 144*b* of the pair of unit block heat sinks 144*a* and 144*b* may be coupled with an opened other side of the second substrate installation space 142*b*, and may shield the other side of the second substrate installation space 142*b*.

Moreover, multiple heat discharge pins (reference numerals not indicated) extended in parallel to one surface of the main board 111 may be provided on the outside surface of the pair of unit block heat sinks 144*a* and 144*b*. The multiple heat discharge pins function to prevent performance degradation of electric parts by directly discharging, to the outside, heat collected in a space formed by the first substrate installation space 142*a* and the second substrate installation space 142*b*.

As described above, the embodiment 100 of the antenna apparatus according to the present disclosure can create an advantage in that it can further improve heat discharge performance in a way that some (i.e., the antenna element 152, the antenna filter 153 and the transmission and reception substrate) of electric parts, that is, heat radiation elements intensively installed in the internal space 116 of the conventional main housing 110, are separated and installed on the outside isolated from the main housing 110 and heat is discharged to the outside through the pair of unit block heat sinks 144*a* and 144*b* for each unit antenna block 140.

Furthermore, the embodiment 100 of the antenna apparatus according to the present disclosure provides an advantage in that dual banding of a frequency band not implemented in one antenna apparatus conventionally can be very easily implemented because the multiple unit antenna blocks 140 are connected and provided in the main board 111 in a way to be detachable.

For example, conventionally, after a frequency band corresponding to the one or more antenna elements 152 and antenna filters 153 connected to the main board 111 through signals is first set to 3.5 GHz, the frequency band may be changed into 4.5 GHz. However, there is inconvenience in that all elements need to be decomposed and newly designed and assembled. However, in the case of the embodiment 100 of the present disclosure, although the frequency band is first set to 3.5 GHz, after the existing unit antenna block 140 is separated, dual banding or more can be implemented through a very simple task of replacing and assembling only the unit antenna block 140 designed to have the antenna element 152 and the antenna filter 153 corresponding to the frequency band of 4.5 GHz to be changed. That is, the multiple unit antenna blocks 140 can be arranged, replaced and assembled so that some of the multiple unit antenna blocks form a first band having the frequency band of 3.5 GHz and other some thereof form a second band having the frequency band of 4.5 GHz. In particular, in this case, there is an advantage in that the multiple unit antenna blocks 140 can be very easily arranged, replaced and assembled by only inserting and connecting the connecting card 149 to be described later to the antenna block 140 through the penetration slot 125 of the cover housing 120.

The multiple unit antenna blocks 140 may be connected to the main board 111 through signals through the medium of the at least one connecting card 149. That is, in the embodiment 100 of the present disclosure, eight unit antenna blocks 140 are provided. Each of the eight unit antenna blocks 140 is connected to the main board 111 through a signal through the at least one connecting card 149 so that the signals of the eight unit antenna blocks 140 are integrated and controlled by the main board 111.

In this case, the penetration slot 125 through which the connecting card 149 connected to each of the multiple unit antenna blocks 140 penetrates may be formed in the cover housing 120. Moreover, one-side card slot hole 148*a* with which one end of the connecting card 149 is pinned may be provided at the end of each of the pair of transmission and reception substrates 148. The other-side card slot hole 115 with which the other end of the connecting card 149 is pinned may be provided in the main board 111. The one-side card slot hole 148*a* and the other-side card slot hole 115 may be provided as a structure in which a 120 pin terminal provided at both ends of the connecting card 149 is socket-coupled.

One connecting card 149 is coupled with a transmission and reception substrate provided on one side of the pair of transmission and reception substrates 148, and one connecting card 149 is coupled with a transmission and reception substrate provided on the other side of the pair of transmission and reception substrates 148. Accordingly, two connecting cards 149 used in the antenna apparatus 100 according to an embodiment of the present disclosure may be adopted in a way to be isolated from each other in the width direction of the multiple unit antenna blocks 140.

In this case, the antenna element 152 of a 4T4R provided so that four transmitters (4T) and four receivers (4R) function is provided in the antenna substrate 150 of each of the unit antenna blocks 140. The pair of transmission and reception substrates 148 may be mounted and provided so that the four transmitters and four receivers 4T4R are divided into two (i.e., 2T2R) and separately function.

Accordingly, if eight or sixteen antenna block bodies 141 are connected to the main board 111, a total of thirty two transmitters (32T) and a total of thirty two receivers (32R) or a total of sixty four transmitters (64T) and a total of sixty four receivers (64R) required for a 5G environment can be implemented.

Meanwhile, as may be seen from FIG. 3, the main board 111 may further include the calibration port 105 provided to be connected to the antenna elements 152 of each of the multiple unit antenna blocks 140. As described above, in the embodiment 100 of the antenna apparatus according to the present disclosure, the multiple unit antenna blocks 140 are coupled in a way to be separated from the main board 111, but phases of frequency bands can be integrated, calibrated and controlled through the connection of the calibration ports 105.

Figure 8:
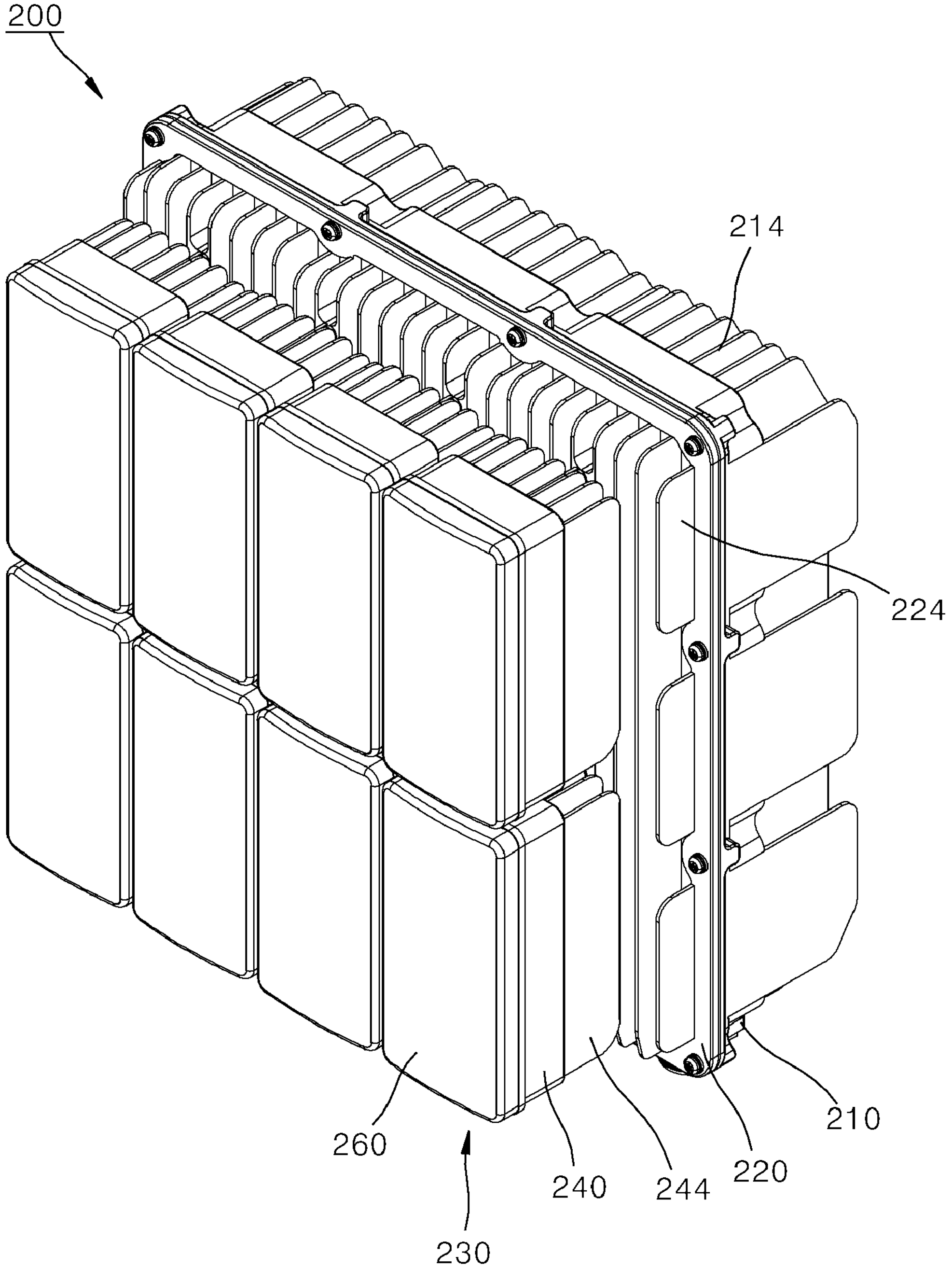
FIG. 8 is a perspective view illustrating an antenna apparatus according to another embodiment of the present disclosure.
Figure 9:
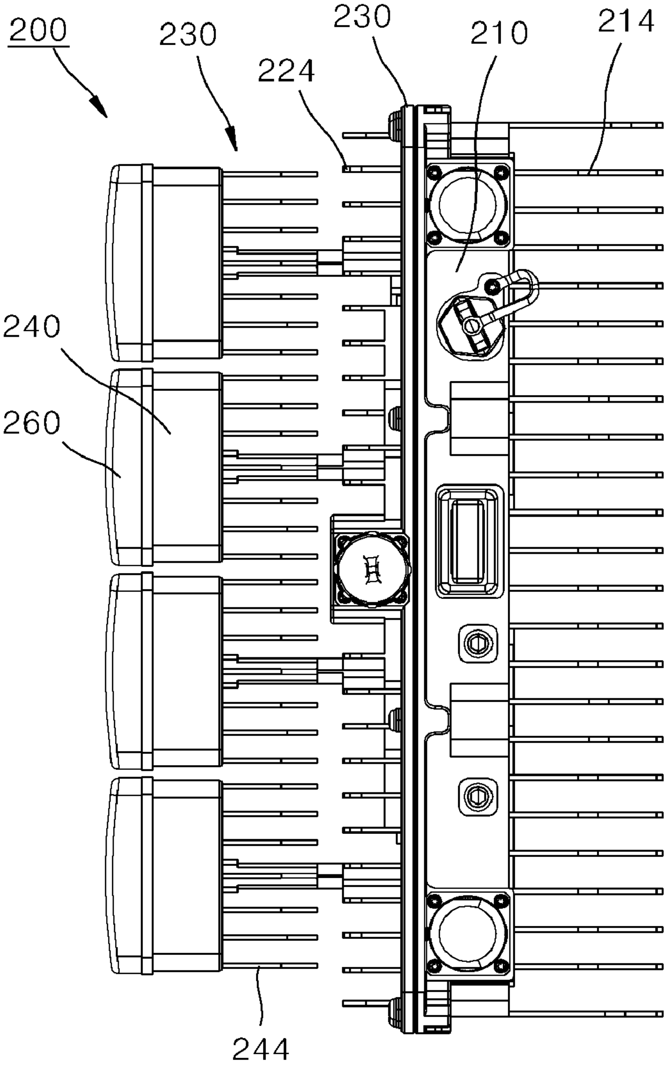
FIG. 9 is a side view of FIG. 8.
Figure 10:
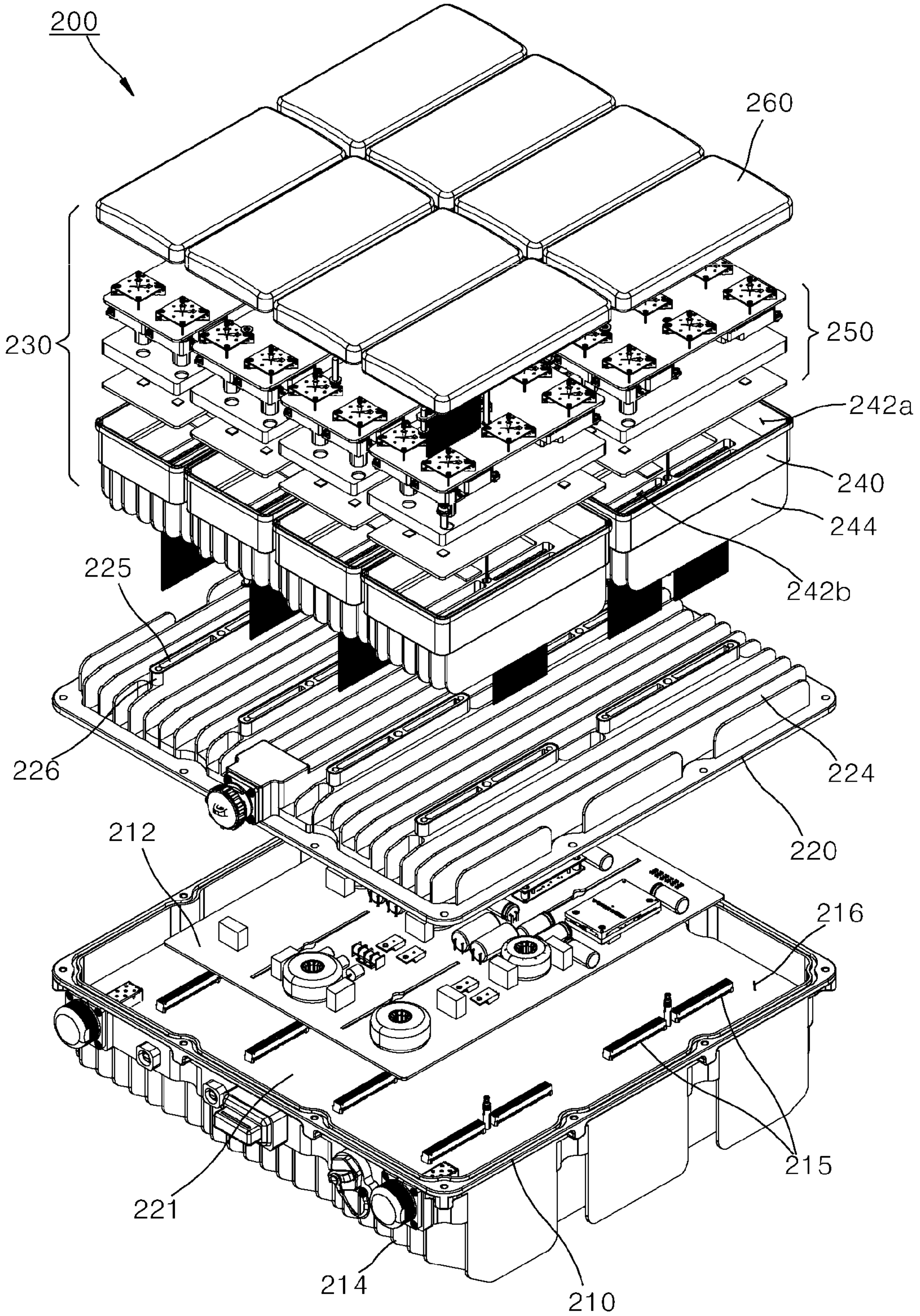
FIG. 10 is an exploded perspective view of FIG. 8.
Figure 11:
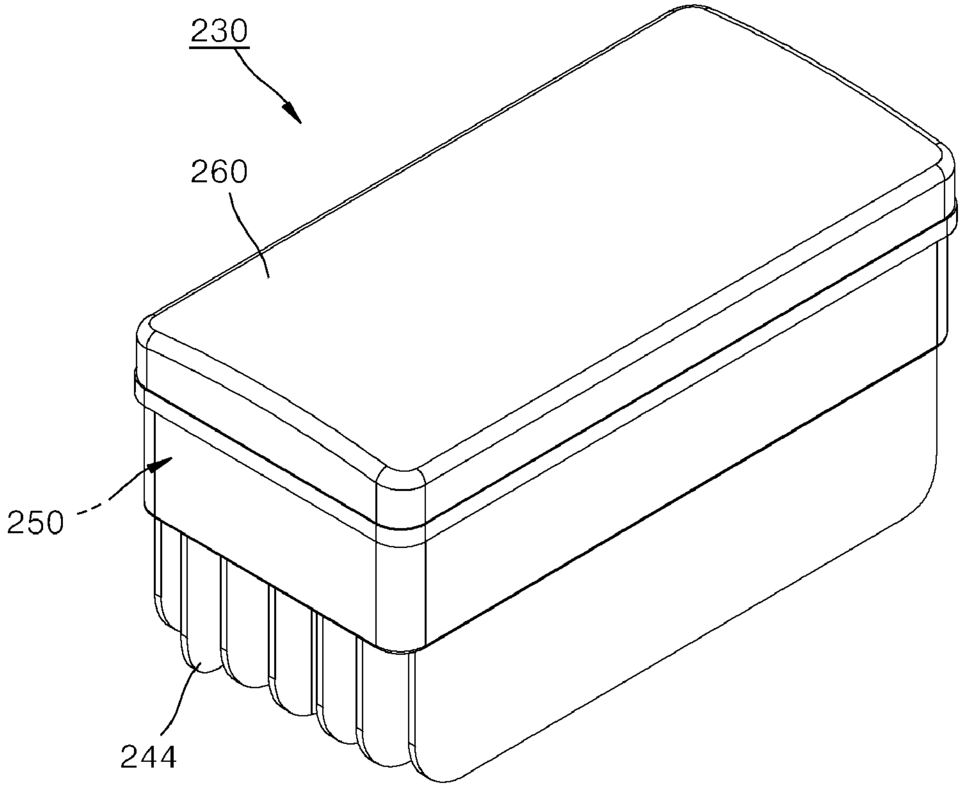
FIG. 11 is a perspective view illustrating a unit antenna block among elements of FIG. 8.
Figure 12:
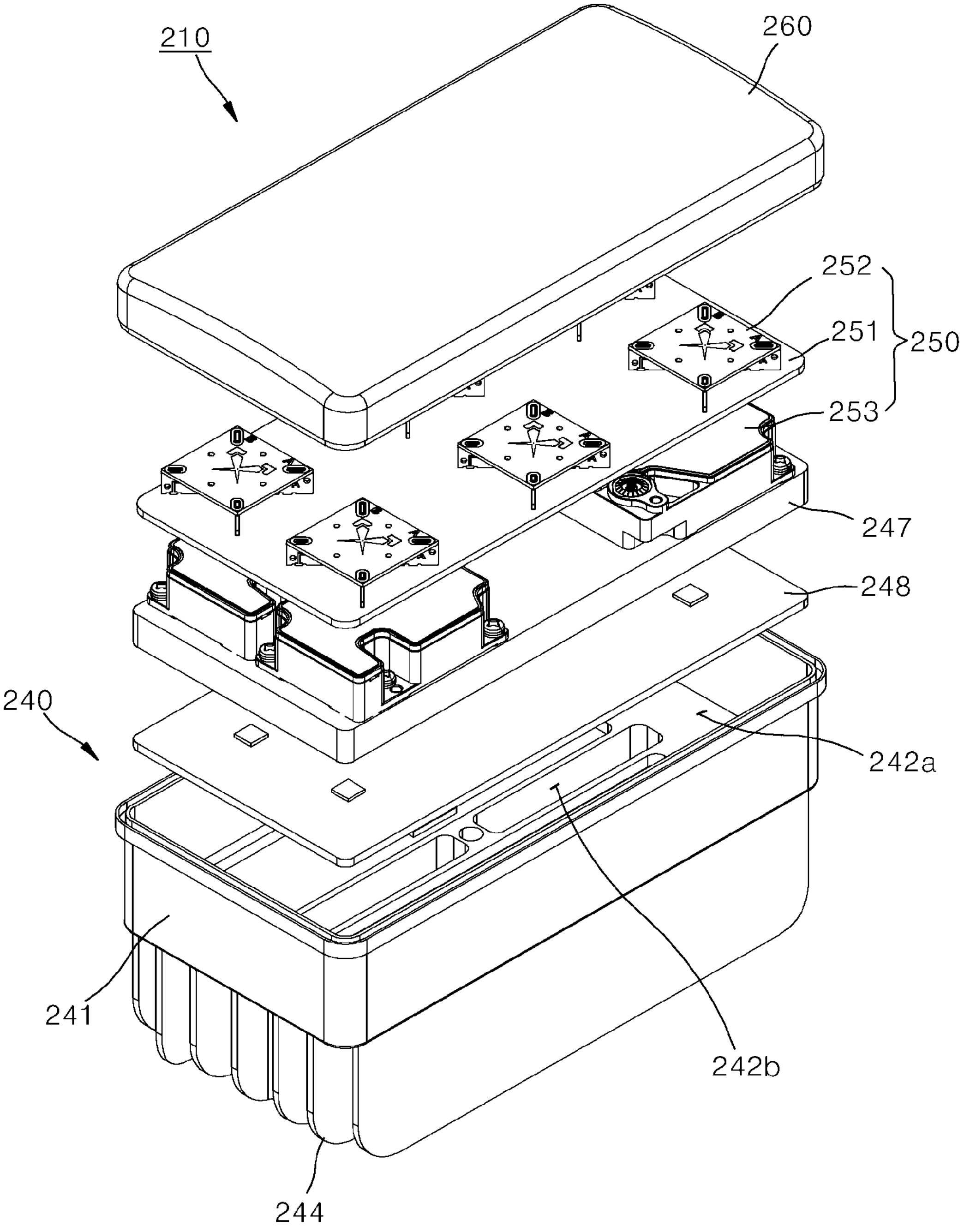
FIG. 12 is an exploded perspective view of FIG. 11.
Figure 13:
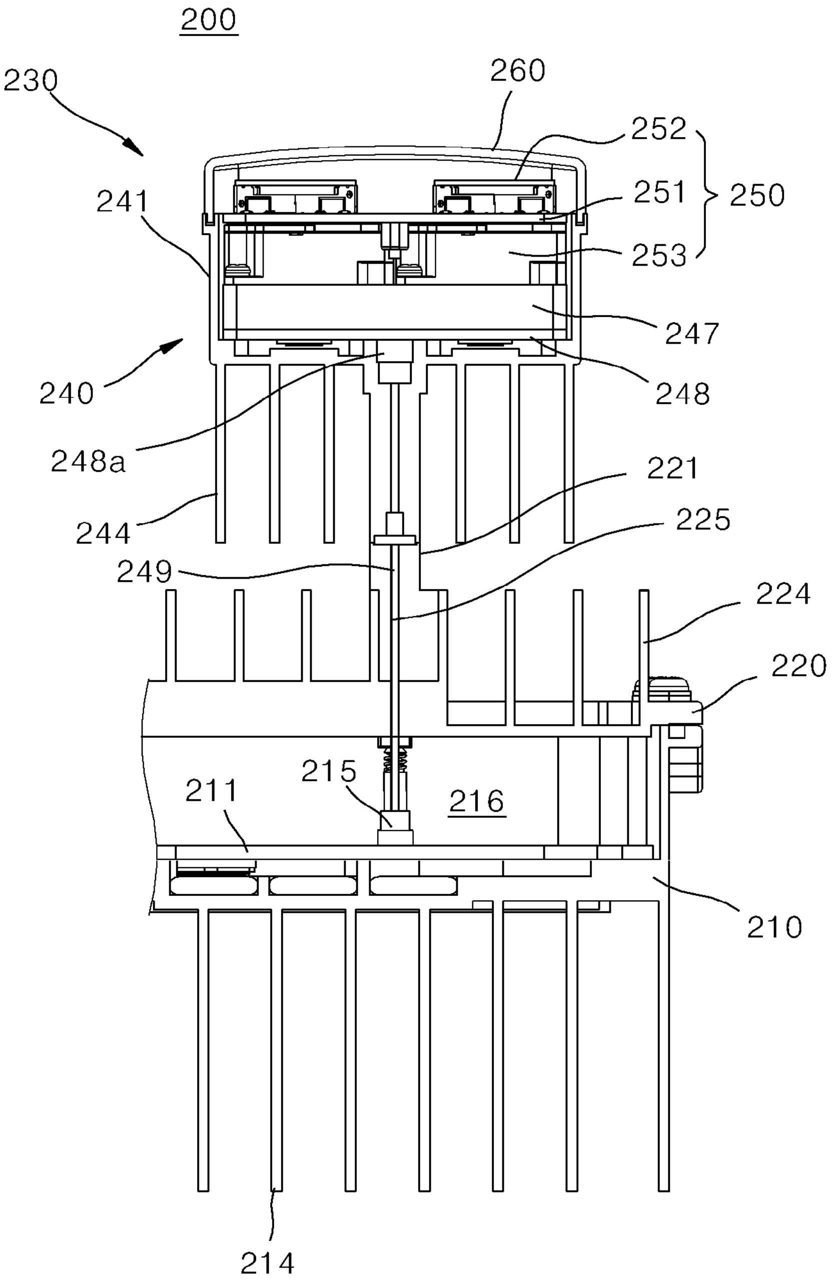
FIG. 13 is a one-side cross-sectional view illustrating a connection relation between the unit antenna block of FIG. 11 and a main board within a main housing.
Figure 14:
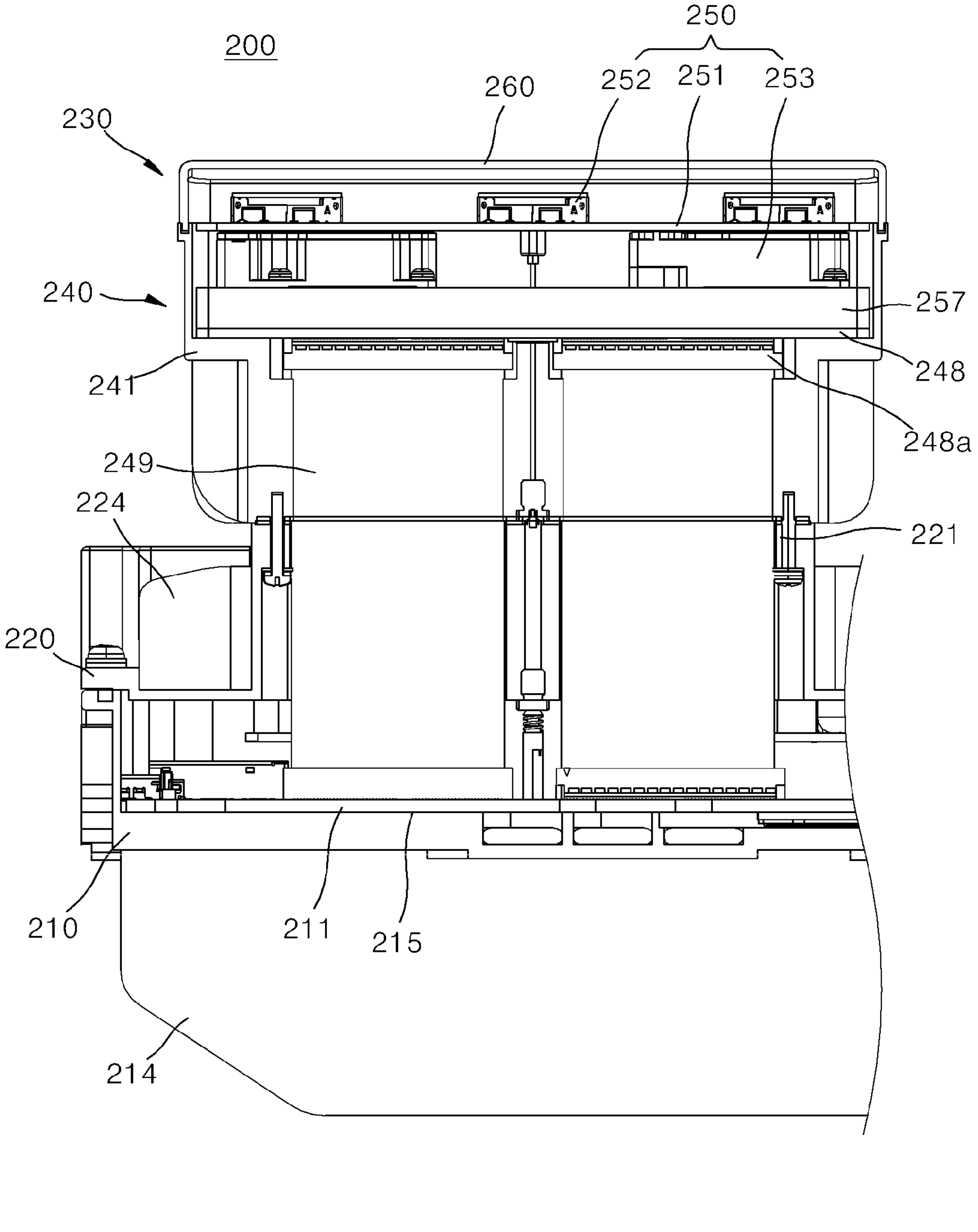
FIG. 14 is the other-side cross-sectional view illustrating a connection relation between the unit antenna block of FIG. 11 and a main board within a main housing.

FIG. 8 is a perspective view illustrating an antenna apparatus according to another embodiment of the present disclosure. FIG. 9 is a side view of FIG. 8. FIG. 10 is an exploded perspective view of FIG. 8. FIG. 11 is a perspective view illustrating a unit antenna block among elements of FIG. 8. FIG. 12 is an exploded perspective view of FIG. 11. FIG. 13 is a one-side cross-sectional view illustrating a connection relation between the unit antenna block of FIG. 11 and a main board within a main housing. FIG. 14 is the other-side cross-sectional view illustrating a connection relation between the unit antenna block of FIG. 11 and a main board within a main housing.

In the case of the antenna apparatus 100 according to an embodiment of the present disclosure described with reference to FIGS. 1 to 7, the two transmission and reception substrates 148 are provided to be separated from each other and are separately responsible for functions of transmitters and receivers with respect to the antenna substrate 150. In contrast, an antenna apparatus 200 according to another embodiment of the present disclosure described hereinafter may be said to be an embodiment in which an antenna substrate 250 and a transmission and reception substrate 248 are not separated for each number of transmitters and receivers.

More specifically, as may be seen from FIGS. 8 to 14, in the antenna apparatus 200 according to another embodiment of the present disclosure, each of multiple unit antenna blocks 240 may further include an antenna block body 241 provided with a substrate installation space 242*a* in which the antenna substrate 250 and the single transmission and reception substrate 248 are installed, and a unit radome 260 coupled with the antenna block body 241 in a way to cover the substrate installation space 242*a*.

That is, in the case of the embodiment 100, the first substrate installation space 142*a* and the second substrate installation space 142*b* in which the antenna substrate 150 is installed are separated and provided in the antenna block body 141. In the case of another embodiment 200, only the single substrate installation space 242*a* may be formed in the antenna block body 241 so that both the antenna substrate 250 and the single transmission and reception substrate 248 are installed.

Furthermore, in the case of the embodiment 100, the pair of transmission and reception substrates is disposed to be orthogonal to the antenna substrate 150. In contrast, in the case of another embodiment 200, the antenna substrate 250 and the single transmission and reception substrate may be mutually stacked and disposed up and down in the drawings. In this case, in the case of the embodiment 100, only the antenna substrate 150 is installed in the first substrate installation space 142*a*. However, in the case of another embodiment 200, both the antenna substrate 250 and the single transmission and reception substrate 248 are mutually stacked and disposed in the single substrate installation space 242*a* in a way to be isolated from each other at a given interval. In this aspect, it is preferred that the height of the single substrate installation space 242*a* is set to be relatively great compared to the embodiment 100.

Moreover, in the case of the embodiment 100, the one-side card slot hole 148*a* with which one end of the connecting card 149 is pinned is provided at the end of the pair of transmission and reception substrates. However, another embodiment 200 is different from the embodiment 100 in that a one-side card slot hole 248*a* with which one end of a connecting card 249 is pinned is provided on "one surface (a bottom in the drawings)" of the single transmission and reception substrate 248. That is, in another embodiment 200, the single transmission and reception substrate 248 is installed in the substrate installation space 242*a* as a structure in which the single transmission and reception substrate 248 is stacked on the antenna substrate 250 in parallel to a main board 211. Accordingly, it is structurally preferred that the one-side card slot hole 248*a* corresponding to a 120 pin coupling socket is formed on one surface of the single transmission and reception substrate 248. In this case, two connecting cards 249 are provided in the single substrate installation space 242*a* in a length direction thereof in a straight-line form. The one-side card slot hole 248*a* may also be arranged in a straight line in the length direction of the single substrate installation space 242*a* so that each of the two connecting cards 249 is socket-coupled therewith.

Meanwhile, as may be seen from FIGS. 11 and 12, the antenna apparatus 200 according to another embodiment of the present disclosure may include a unit block heat sink 244 for discharging heat generated from the substrate installation space 242*a* on a surface toward a cover housing 220 in the antenna block body 241. The unit block heat sink 244 may be provided with multiple heat discharge pins (reference numerals not indicated) extended and formed toward the main board 211. That is, the unit block heat sink 244 may be extended and formed in a way to be orthogonal to one surface of the main board 211.

Moreover, in the antenna apparatus 200 according to another embodiment of the present disclosure, a single EMI shielding unit 247 disposed between the antenna substrate 250 and the single transmission and reception substrate 248 and shielding EMI may be further included in the substrate installation space 242*a*.

Even in the antenna apparatus 200 configured as described above according to another embodiment of the present disclosure, four transmitters (4T) and four receivers (4R) may be mounted on the single transmission and reception substrate 248. Eight or sixteen antenna block bodies 241 may be connected to the main board 211, so that thirty two transmitters (32T) and thirty two receivers (32R) or sixty four transmitters (64T) and sixty four receivers (64R) can be implemented.

That is, except that in the case of the embodiment 100, the transmission and reception substrates 148 are provided as a pair and separated from each other and each are implemented to correspond to the function of the 2T2R in accordance with the antenna substrate 150 that performs the function of the 4T4R, even in the case of another embodiment 200 of the present disclosure, the aforementioned 32T32R or 64T64R can be implemented because only the single transmission and reception substrate 248 corresponding to the antenna substrate 250 that performs the functions of the 4T4R is provided.

Elements not described among the elements of the antenna apparatus 200 according to another embodiment of the present disclosure, which are implemented through FIGS. 8 to 14, have the same structures and characteristics as those of the antenna apparatus 100 according to an embodiment of the present disclosure, which have been described through FIGS. 1 to 7, except the aforementioned differences and will be substituted with the descriptions of the elements of the antenna apparatus 100.

As described above, the antenna apparatus 100, 200 according to embodiments of the present disclosure provides advantages in that a selective change from a conventional single band to a frequency band for dual banding is easy and a product having higher reliability can be fabricated through the distribution of heat discharge because the antenna substrate 150, 250 and the transmission and reception substrate 148, 248 are separated from the main housing 110, 210 provided with the main board 111, 211 responsible for integrated calibration control and integrated signal control and detachably provided for each module.

As described above, embodiments of the antenna apparatus according to the present disclosure have been described in detail with reference to the accompanying drawings. However, embodiments of the present disclosure are not essentially limited by the aforementioned embodiments and may be naturally implemented, and may be changed in various ways and implemented within an equivalent range thereof by a person having ordinary knowledge in the art to which the present disclosure pertains. Accordingly, the true scope of rights of the present disclosure may be said to be defined by the appended claims.

[Industrial Applicability]

The present disclosure provides the antenna apparatus capable of being partitioned and installed for each module, which can be easily applied to dual banding for an available frequency band and can be changed and designed from a preset frequency band to a different frequency band and which can extend unit heat discharge efficiency of multiple heating elements.

The invention claimed is:

1. An antenna apparatus comprising:

a main housing having an internal space formed therein so that a main board is embedded and provided with multiple heat discharge pins on an outside surface of the main housing;

a cover housing provided to shield the internal space of the main housing and provided with multiple heat discharge pins on an outside surface of the cover housing; and multiple unit antenna blocks detachably coupled to the outside surface of the cover housing and having an antenna substrate with which one or more antenna elements and one or more antenna filters are coupled embedded therein, wherein the multiple unit antenna blocks are connected to the main board through a signal through a medium of at least one connecting card which penetrates the outside surface of the cover housing.

2. The antenna apparatus of claim 1, wherein the cover housing is provided with a mounting part in which a part of an end of each of the multiple unit antenna blocks is received in a form in which some of the multiple heat discharge pins on the other side have been removed.

3. The antenna apparatus of claim 1, wherein a penetration slot through which a connecting card connected to each of the multiple unit antenna blocks penetrates is formed in the cover housing.

4. The antenna apparatus of claim 1, wherein a calibration port is mounted on the main board in a way to be connected to an antenna element of each of the multiple unit antenna blocks.

5. The antenna apparatus of claim 4, wherein phases of frequency bands of the antenna elements of the multiple unit antenna blocks are integrated, calibrated and controlled by the main board.

6. An antenna apparatus comprising:

a main housing having an internal space formed therein so that a main board is embedded and provided with multiple heat discharge pins on an outside surface of the main housing;

a cover housing provided to shield the internal space of the main housing and provided with multiple heat discharge pins on an outside surface of the cover housing; and multiple unit antenna blocks detachably coupled to the outside surface of the cover housing and having an antenna substrate with which one or more antenna elements and one or more antenna filters are coupled embedded therein, wherein the multiple unit antenna blocks are connected to the main board through a signal through a medium of at least one connecting card, wherein each of the multiple unit antenna blocks comprises:

an antenna block body provided with a first substrate installation space having the antenna substrate installed therein and a second substrate installation space on the cover housing side in a way to be partitioned from the first substrate installation space;

a pair of transmission and reception substrates installed on one side and the other side of the second substrate installation space in a way to be orthogonal to the main board; and a unit radome coupled with the antenna block body in a way to cover the first substrate installation space.

7. The antenna apparatus of claim 6, wherein:

a one-side card slot hole with which one end of the connecting card is pinned is provided at an end of each of the pair of transmission and reception substrates, and the main board is provided with the other-side card slot hole with which the other end of the connecting card is pinned.

8. The antenna apparatus of claim 7, wherein signal processing of the antenna elements of the multiple unit antenna blocks is integrated and controlled by the main board.

9. The antenna apparatus of claim 6, wherein the antenna block body is provided with a pair of unit block heat sinks provided to shield the second substrate installation space on one side in a width direction thereof and the other side in a width direction thereof, respectively, and for discharging heat generated from the first substrate installation space and the second substrate installation space.

10. The antenna apparatus of claim 9, wherein the pair of unit block heat sinks is extended in parallel to one surface of the main board.

11. The antenna apparatus of claim 9, wherein at least one EMI shielding unit disposed between the pair of transmission and reception substrates and shielding EMI therebetween is further provided in the second substrate installation space of the antenna block body.

12. The antenna apparatus of claim 6, wherein:

two transmitters (2T) and two receivers (2R) are mounted on each of the pair of transmission and reception substrates, and eight or sixteen antenna block bodies are coupled with the main board so that thirty two transmitters (32T) and thirty two receivers (32R) or sixty four transmitters (64T) and sixty four receivers (64R) are able to be implemented.

13. An antenna apparatus comprising:

a main housing having an internal space formed therein so that a main board is embedded and provided with multiple heat discharge pins on an outside surface of the main housing;

a cover housing provided to shield the internal space of the main housing and provided with multiple heat discharge pins on an outside surface of the cover housing; and multiple unit antenna blocks detachably coupled to the outside surface of the cover housing and having an antenna substrate with which one or more antenna elements and one or more antenna filters are coupled embedded therein, wherein the multiple unit antenna blocks are connected to the main board through a signal through a medium of at least one connecting card, wherein each of the multiple unit antenna blocks further comprises:

an antenna block body provided with a substrate installation space in which the antenna substrate and a single transmission and reception substrate are installed; and a unit radome coupled with the antenna block body in a way to cover the substrate installation space.

14. The antenna apparatus of claim 13, wherein:

a one-side card slot hole with which one end of the connecting card is pinned is provided on one surface of the single transmission and reception substrate, and the other-side card slot hole with which the other end of the connecting card is pinned is provided in the main board.

15. The antenna apparatus of claim 13, wherein a unit block heat sink for discharging heat generated from the substrate installation space is provided on a surface of the antenna block body toward the cover housing.

16. The antenna apparatus of claim 15, wherein the unit block heat sink is extended in a way to be orthogonal to one surface of the main board.

17. The antenna apparatus of claim 13, wherein a single EMI shielding unit disposed between the antenna substrate and the single transmission and reception substrate and shielding EMI therebetween is further provided in the substrate installation space of the antenna block body.

18. The antenna apparatus of claim 13, wherein:

four transmitters (4T) and four receivers (4R) are mounted on the single transmission and reception substrate, and eight or sixteen antenna block bodies are coupled with the main board so that thirty two transmitters (32T) and thirty two receivers (32R) or sixty four transmitters (64T) and sixty four receivers (64R) are able to be implemented.

19. The antenna apparatus of claim 13, wherein the antenna substrate and the single transmission and reception substrate are stacked and disposed in the substrate installation space in a way to be isolated from each other at a given interval.

* * * * *